UNITED STATES PATENT OFFICE.

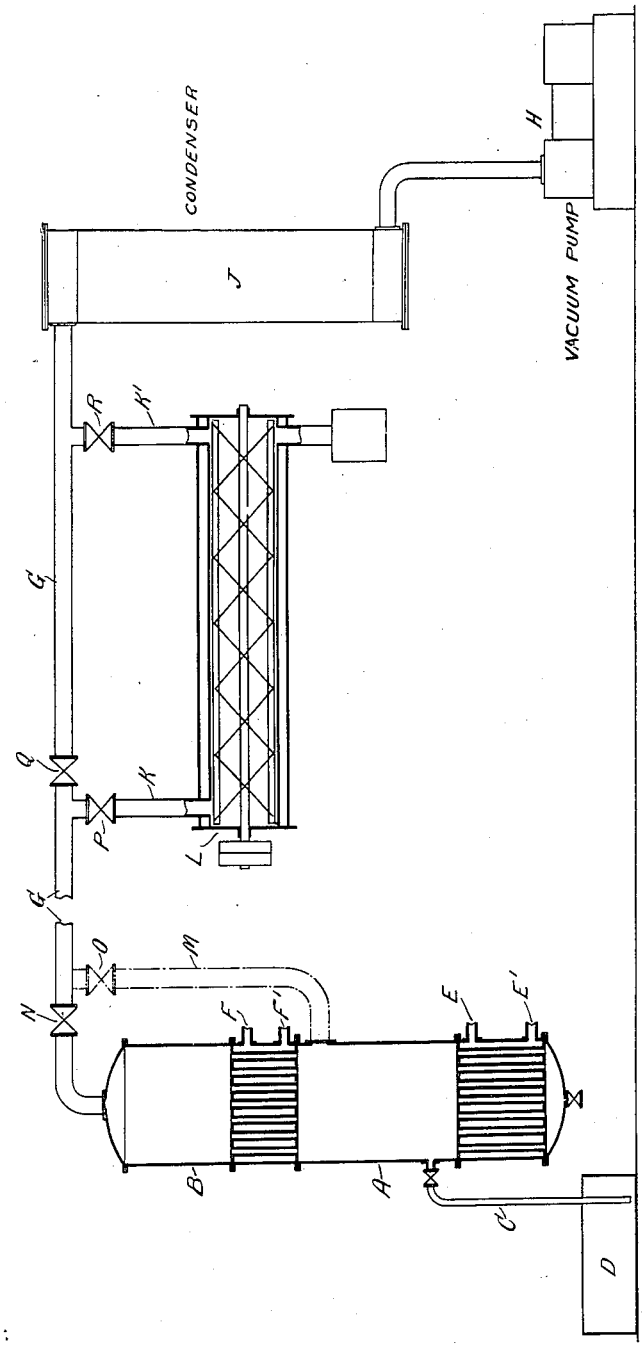

WILLIAM ANDERSON, OF HELENSBURGH, AND JAMES MEIKLE, OF GLASGOW, SCOTLAND.

PROCESS OF EVAPORATION, CONCENTRATION, AND DISTILLATION.

1,056,877.  Specification of Letters Patent.  Patented Mar. 25, 1913.

Application filed June 3, 1912. Serial No. 701,236.

*To all whom it may concern:*

Be it known that we, WILLIAM ANDERSON and JAMES MEIKLE, subjects of the King of the United Kingdom of Great Britain and Ireland, and residing at Helensburgh, Scotland, and Maryhill, Glasgow, Scotland, respectively, have invented a certain new and useful Improvement in Processes of Evaporation, Concentration, and Distillation, of which the following is a specification.

This invention relates to the concentration, evaporation and distillation of liquids which may contain animal, vegetable, or mineral maters in solution, *e. g.*, to the evaporation of volatile solvents from animal fats, as in the extraction of soluble substances from bones, evaporation of liquors containing sugar, tannin or glycerin, and the concentration of solutions of caustic soda. When such liquids are subjected to the action of heat, especially under pressure less than atmospheric, it is commonly found that, if the heat be not nicely controlled in relation to the pressure on the surface of the liquid, frothing or foaming takes place, and it has been attempted in several cases to prevent the frothing or foaming as far as possible.

The deliberate object of the present invention is to utilize this phenomenon as a means of obtaining the liquid in a finely distributed condition in which condition it will readily be converted wholly or in part into vapor, the solution being concentrated, or, if the solvent be wholly evaporated, the dissolved matter being left as a solid residue.

The present process consists in heating the liquid under sub-atmospheric pressure or partial vacuum to convert substantially the entire body of liquid into froth or foam, transferring the froth or foam to a second heating surface, and heating under sub-atmospheric pressure the froth or foam so transferred.

An improved construction of apparatus for performing the process is shown diagrammatically in part side elevation part vertical section in the figure of the accompanying drawing.

As shown therein, A is a primary evaporator which is surmounted by a secondary evaporator B of similar construction. A pipe C connects the evaporator A with a tank D containing the solution to be treated.

E, F, denote connections for leading a heating medium (*e. g.*, steam or hot oil) to the intermediate tubular sections of the evaporating apparatus: E′, F′ denote the corresponding return connections.

G is a valved pipe leading from the upper end of the evaporator B connected with a suction or vacuum pump H, a condenser being interposed at J.

K, K′ denote valved by-pass connections from the pipe C to a drying cylinder L which may be fitted with a conveyer acting as a stirrer and which is surrounded by a heating jacket.

M is a valved by-pass connection from the evaporator A to the pipe C.

N, O, P, Q and R are the valves.

It will be understood that the sub-atmospheric pressure in the entire apparatus, induced by the suction of the pump H, causes the liquid to be drawn into said apparatus from the tank D. Said liquid is first heated under said sub-atmospheric pressure in the evaporator A and thereby converted into froth or foam, said froth or foam being constituted by bubbles each consisting of a skin of liquor filled with vapor. The foam, while still unconverted into vapor, but while in a condition to be readily so converted is separated from the main body of liquid and transferred to the evaporator B, said transfer being facilitated by the suction above referred to. In the evaporator B the froth or foam is further heated, still under sub-atmospheric pressure, and parts with a large part of its moisture, whereby the solution may be highly concentrated. If it be desired to bring the matter in solution to a state of dryness, or to concentrate the solution still further, the heating of the foam in the evaporator B is discontinued and the foam is, by the action of the suction transferred to the cylinder L, where the solution may be concentrated, or the solvent wholly evaporated.

What we claim is:—

1. A process of concentrating, evaporating and distilling liquids consisting in heating the liquid under sub-atmospheric pressure induced by suction to convert the liquid into froth, withdrawing the froth while the same is still unconverted into vapor by said suction to separate the same from the main body of liquid, and applying additional heat to the hot froth so separated while still under said sub-atmospheric pressure.

2. A process of concentrating, evaporating and distilling liquids consisting in drawing the liquid from a suitable source by suction, heating said liquid under the sub-atmospheric pressure induced by said suction to convert the liquid into froth, withdrawing the froth while the same is still unconverted into vapor by said suction to separate the same from the main body of liquid, and applying additional heat to the froth so separated while still under said sub-atmospheric pressure.

In testimony whereof we have signed our names to this specification in the presence of two subscribing witnesses.

WILLIAM ANDERSON.
JAMES MEIKLE.

Witnesses:
WALLACE CRANSTON FAIRWEATHER,
JOHN McCLEARY.